Nov. 10, 1942.  N. E. WAHLBERG  2,301,484
GEAR SHIFT
Filed May 18, 1940  2 Sheets-Sheet 1

INVENTOR.
NILS ERIK WAHLBERG.
BY Carl J. Barbee
ATTORNEY.

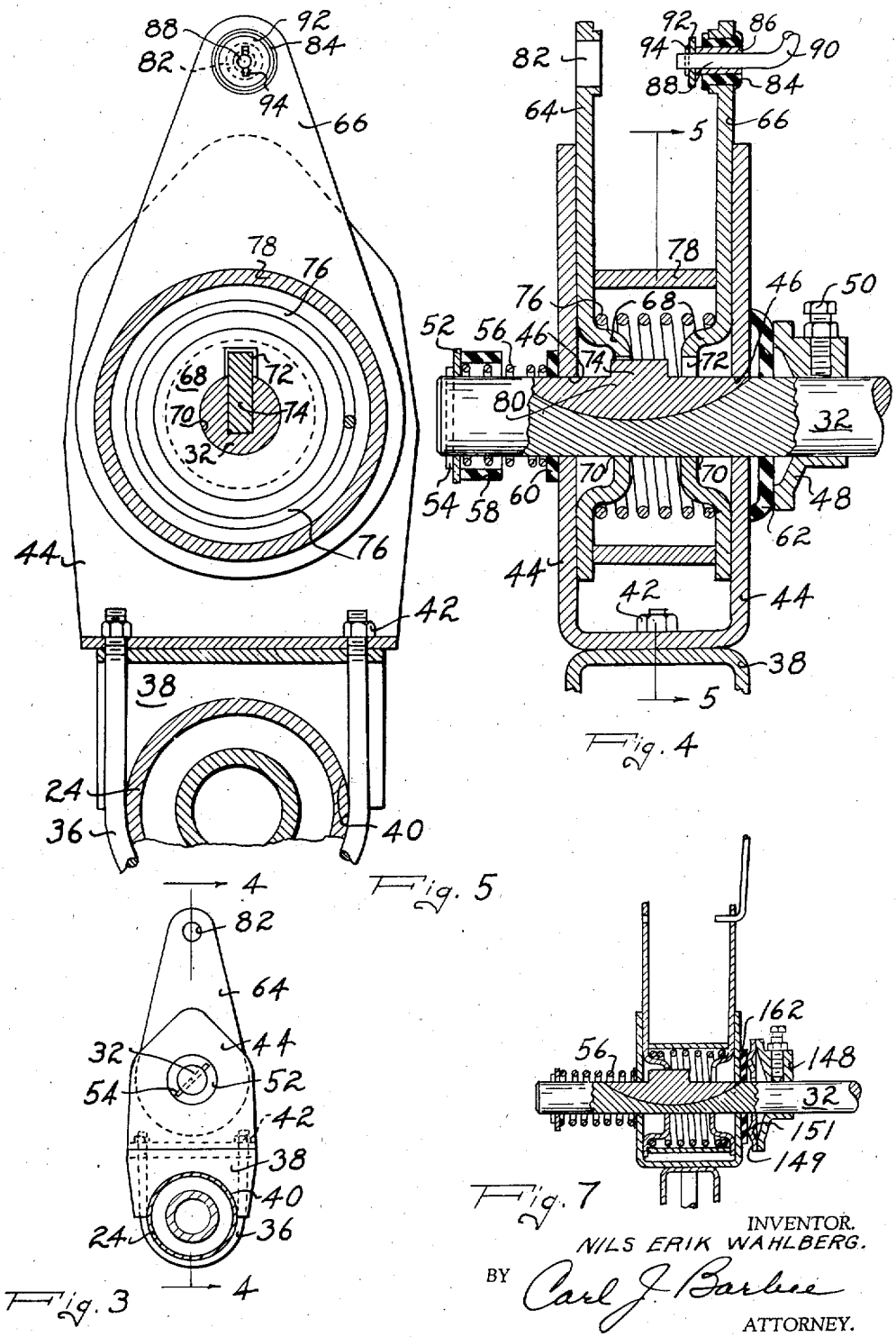

Patented Nov. 10, 1942

2,301,484

UNITED STATES PATENT OFFICE 2,301,484

GEAR SHIFT

Nils Erik Wahlberg, Kenosha, Wis., assignor to Nash-Kelvinator Corporation, Kenosha, Wis., a corporation of Maryland Application May 18, 1940, Serial No. 335,936

13 Claims. (Cl. 74—484)

This invention relates to gear shifting mechanism and has particular reference to a gear shifting mechanism arranged to be operated from the steering column of an automobile.

It is an object of this invention to provide gear shifting mechanism which will be cheaper to construct than mechanism known heretofore.

It is another object of this invention to provide shifting mechanism which has few parts and is easily installed.

It is another object of this invention to provide shifting mechanism which has few connections and is therefore easy to operate and not liable to rattle.

It is another object of this invention to provide novel means for preventing the transmission of vibrations through gear shifting mechanism.

Other objects and advantages of this invention will be apparent from a consideration of the following description and claims and attached drawings of which there are two sheets and in which—

Figure 3 is a sectional view taken along a plane indicated by the line 3—3 of Figure 1 and looking in the direction of the arrows;

Figure 4 is a sectional view taken along the plane indicated by the line 4—4 of Figure 3 and looking in the direction of the arrows;

Figure 5 is a sectional view taken along the plane indicated by the line 5—5 in Figure 4 and looking in the direction of the arrows;

Figures 1, 6:
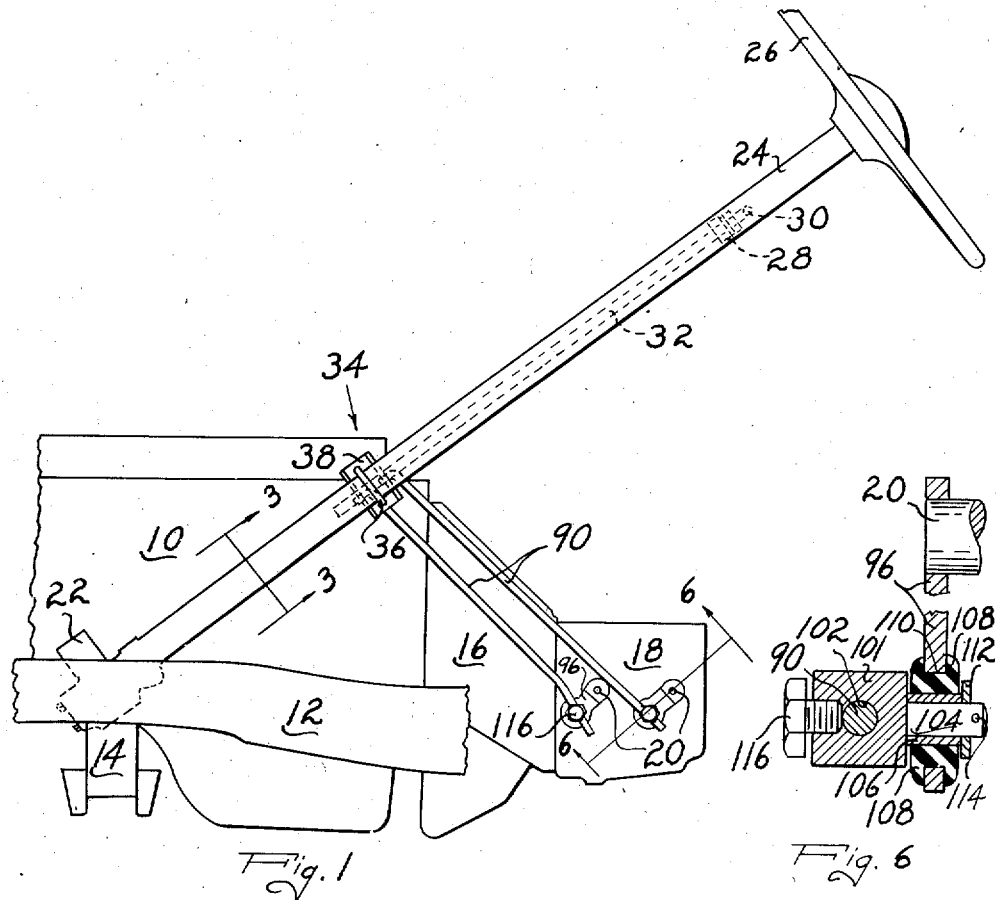
Figure 1 represents a side elevation of a portion of an automobile showing my shifting mechanism installed thereon.
Figure 6 is a sectional view taken along a plane indicated by the line 6—6 in Figure 1 and looking in the direction of the arrows; and, Figure 7 is a sectional view similar to Figure 4 but illustrating a modified form of my invention.
Figure 2:
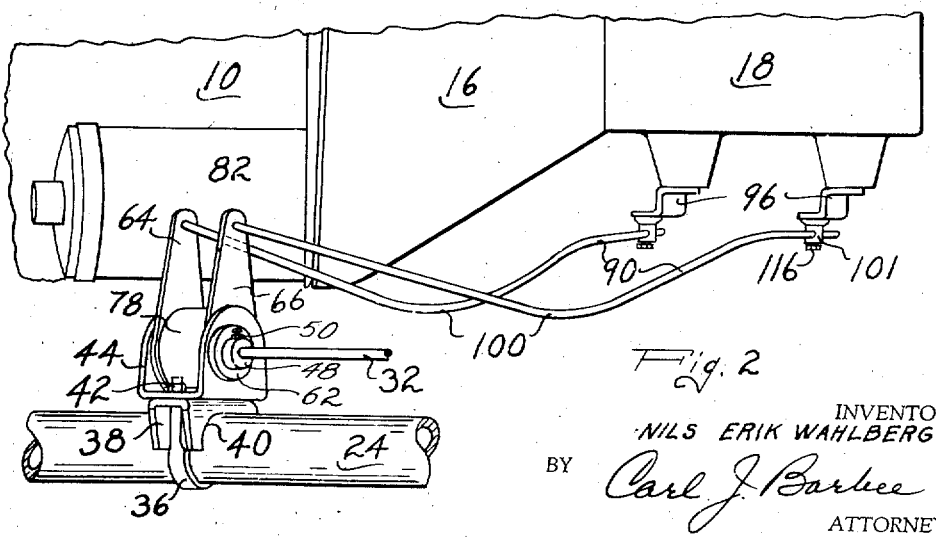
Figure 2 is a plan view of the structure illustrated in Figure 1.

Illustrated in Figure 1 is an automobile engine 10 supported in any suitable manner upon the frame 12 and cross member 14. The engine 10 has rigidly secured to its back side the clutch housing 16 and transmission housing 18. The transmission housing 18 encloses any suitable type of change speed gearing which is arranged to be selectively engaged in different speed ratios by the rotation of two shafts 20 which extend through the side wall of the housing 18.

Secured to the cross member 14 is a suitable steering gear 22 from which the steering column 24 extends upwardly to the steering wheel 26 in the usual manner. Fastened to the steering column 24 just under the wheel 26 is a bracket 28 which supports an operating handle 30 (see Figure 1) in any position which will be convenient to the operator. Connected to the handle 30 is a shift rod 32 which is arranged to be rotated by the handle 30 and moved axially along its own axis. The rod 32 extends down the side of the column 24 to my shifting mechanism generally indicated at 34.

Attached to the steering column 24 by means of a U-bolt 36 is a U-shaped stamping 38, the legs of which are notched as at 40 to seat against the column 24. Secured against the base of the U-shaped clip 38 by the nuts 42 on the U-bolt 36 is a second U-shaped bracket 44, the legs of which are apertured as at 46 to rotatably support the lower end of the shift rod 32. Downward movement of the rod 32 is limited by a collar 48 secured to the rod 32 above the bracket 44 by means of a set screw 50. The rod 32 extends below the bracket 44 for a short distance and is provided with a washer 52 held in place between a cotter pin 54 and a coil spring 56 which urges the washer 52 and rod 32 downwardly. Upward movement of the rod 32 is yieldingly limited by an annular rubber gasket 58 which seats against a rubber washer 60 positioned around the rod 32 and against the lower leg of the U-shaped bracket 44. Collar 48 seats against the cupped rubber washer 62 carried on the upper leg of bracket 44 to limit downward movement of rod 32. The cupped washer 62 also provides a friction force between itself and the collar 48 which prevents accidental rotation and vibration of the rod 32.

Positioned within the bracket 44 are two arms 64 and 66. The arms 64 and 66 are deformed as by stamping to provide cupped surfaces 68 which extend toward each other and are apertured as at 70 to pass the rod 32. In addition the apertures 70 are slotted as at 72 to receive the key 74 fitted in the shaft 32. Positioned between the arms 64 and 66 and centered by the cupped surfaces 68 is a coil spring 76 which presses the arms away from each other and into contact with the inner surfaces of the bracket 44. The spring 76, cupped surfaces 68, and key 74 are enclosed by the cylindrical sleeve 78 which fits between the arms 64 and 66. The sleeve operates to keep dirt from the operating mechanism and will retain grease or other lubricant around the moving parts of the mechanism. It will be noted that the key 74 is provided with a long arc-shaped portion 80 (see Figure 4) which is as long as the distance between the legs of the U-shaped bracket 44 plus an amount equal to the distance of travel of the rod 32. As a result the key 74 is always maintained in place in the keyway of the shaft 32 by the walls of the apertures 46. The projecting portion of the key 74 is just long enough so that at the lower position of the rod 32 (see Figure 4), it will engage notch 72 in arm 64 and clear the notch in arm 66. By raising the rod 32, the key will be engaged in arm 66. I contemplate that any suitable lockout and cross over mechanism known to the art today will be used with the transmission mechanism in case 18 to prevent simultaneous movement of arms 64 and 66. In operation the shaft 32 and key 74 are arranged so that in their lowest position, as shown in Figure 4, the key 74 engages the notch 72 in the cupped surface 68 of the arm 64. Rotation of the rod 32 by means of the handle 30 will then rotate the arm 64 so that its end moves upwardly or downwardly. By raising the rod 32 the key 74 may be engaged in the notch 72 of the upper arm 66 and movement may be imparted thereto in the same manner.

The outer ends of arms 64 and 66 are apertured as at 82 and I have provided flanged rubber grommets 84 which fit into the apertures 82. Positioned within the rubber grommets are metal sleeves 86 in which are journaled the bent over ends 88 of transmission rods 90. The rods 90 are maintained in the sleeves 86 by washer 92 pinned to the end of the bent over portion 88 by cotter pins 94. Transmission rods 90 extend downwardly and backwardly to the transmission 18 where they are secured to levers 96 in a manner which will be particularly described later. Levers 96 are each rigidly secured as by welding to one of the shafts 20 for rotation therewith. Thus, upward movement of either of the arms 64 or 66 will result in its corresponding shaft 20 being given a clockwise rotation as illustrated in Figure 1. Downward movement of the arms will impart a counterclockwise movement to the transmission shafts. It will be noted that the transmission rods 90 are bent outwardly as at 100 in order to clear the clutch housing 16. I contemplate that the transmission 18 will have some suitable lock out mechanism well known in the art today which will prevent the movement of one of the shafts 20 until the other shaft has been returned to its neutral position. In this manner it is assured that the notches 72 in the arms 64 and 66 will always be at the neutral position except when one of them is engaged and intentionally shifted by the key 74. It is therefore impossible for my mechanism to become jammed.

The connection between the transmission rods 90 and the levers 96 is illustrated in Figure 6 and consists of a block 101 apertured at 102 and having a short shaft 104 formed on one side thereof. The shaft 104 is journaled in a bearing 106 carried in a rubber grommet 108 which is grooved around its outer edge to fit within an aperture 110 in the end of the lever 96. A washer 112 and pin 114 retain the shaft in place. The ends of rods 90 are retained in the apertures 102 by set screws 116 threaded into the blocks 101. From the above description it is evident that the blocks 101 may rotate with respect to the levers 96 and that the rubber grommets 108 will absorb sound and vibration from the transmission and prevent it from reaching the rest of the shifting mechanism.

Illustrated in Figure 7 is a modified type of my invention which is the same in all respects as the preferred form just described except that the collar 148 carries a thin metal plate 149 on which is formed the annular rib 151. The rib 151 seats against the flat washer 162 and prevents the rod 32 from vibrating or being accidentally rotated. The plate 149 contacts the collar 148 around the periphery thereof, while the rib 151 contacts the washer 162 along a circle within the periphery of the collar so that the plate 149 acts as a spring to cushion the rod 32 at the lower limit of its travel. It will be noted that the face of the collar 148 is cut back to provide room for the plate 149 to bend. On the lower end of the rod 32 I have provided only a spring 56 and have omitted the annular gasket 58 which is employed in the preferred form of my invention.

While I have described my invention in some detail, I intend this description to be an example only and not limiting on my invention to which I make the following claims:

1. In combination with a shift rod arranged to be rotated and moved axially, a bracket having a U-shaped cross section, said rod being journaled in the legs of said bracket, a pair of arms supported on said rod between the legs of said bracket and arranged for relative rotary movement between said rod and said arms, keyways formed in said arms, and a key carried by said rod and having a radially extending portion arranged to engage either of said arms, said key extending along said rod for a distance as great as the distance between the legs of said bracekt plus the length of axial movement of said rod.

2. In combination with a shift rod arranged to be rotated and moved axially, a bracket having a U-shaped cross section, said rod being journaled in the legs of said bracket, a pair of arms supported on said rod between the legs of said bracket and arranged for relative rotary movement between said rod and said arms, keyways formed in said arms, a key carried by said rod and having a projecting portion arranged to engage either of said keyways, and cushioned stops carried by said rod and arranged to limit the axial movement of said rod to prevent the projecting portion of said key from striking said bracket, said key having a rod engaging portion flush with the surface of said rod and extending along said rod for a distance as great as the distance between the legs of said bracket plus the length of axial movement of said rod, said rod engaging portions being held in position on said rod by engagement with the legs of said bracket.

3. In combination with a shift rod arranged to be rotated and moved axially, a pair of arms supported on said rod and arranged for relative rotary movement between said rod and said arms, keyways formed in said arms, a key carried by said rod and arranged to engage either of said arms, means for preventing movement of said arms axially with said rod, said last mentioned means being operative to support said rod, stops secured to said rod above and below said means, and deformable members having a high coefficient of friction positioned between said means and each of said stops whereby a frictional force restraining said rod against rotation is created when said rod is positioned at either end of its axial motion.

4. In combination with a shift rod arranged to be operated from a steering column, a pair of arms supported on said rod and arranged for relative rotary movement between said rod and said arms, keyways formed in said arms, a key carried by said rod and arranged to engage either of said arms, a pair of brackets formed of flat material bent into U-shaped cross section, the legs of one of said brackets forming saddle portions engageable with said steering column, the legs of the other of said brackets defining journals for the lower end of said shift rod, and a single clamp arranged to clamp the bases of said brackets together and to hold said saddle portions on said steering column, said arms being positioned between the legs of the other of said brackets.

5. In combination with a shift rod arranged to be rotated and moved axially, a pair of arms supported on said rod and arranged for relative rotary movement between said rod and said arms, keyways formed in said arms, a key carried by said rod and arranged to engage either of said arms, means for preventing movement of said arms axially with said rod, a stop on said rod for limiting the axial movement of said rod in one direction, and a deformable cup shaped member between said stop and said first mentioned means to provide a friction force for preventing accidental rotation of said rod when said rod is at one limit of its axial movement.

6. In combination with a shift rod arranged to be operated from adjacent a steering column, a U-shaped bracket, the legs of which define aligned apertures, the lower end of said rod being journaled in said apertures, a pair of arms having cupped surfaces formed thereon, said cupped surfaces defining apertures and keyways and positioned around said rod, a coil spring separating said arms and urging them against the legs of said U-shaped bracket, said coil spring being centered by said cup-shaped surfaces, a key carried by said rod and engageable with the keyways in said arms, a long rod engaging portion on said key, said rod engaging portions being long enough to be retained by the legs of said U-shaped bracket in all operating positions of said rod, a collar secured to said rod above said U-shaped bracket, a washer secured to said rod below said U-shaped bracket, said collar and said washer being spaced further apart than the thickness of said U-shaped bracket and cushioning means between said collar and said bracket and between said washer and said bracket.

7. In combination with a rotatable and axially movable shift rod, a U-shaped bracket supporting said rod, a pair of arms formed of flat material and having cup-shaped portions defining apertures formed therein supported at spaced intervals on said rod and within said U-shaped bracket, a sleeve positioned around said rod and separating said arms, and key means for rotatably connecting said rod and said arms.

8. Gear shifting mechanism comprising a shift rod arranged to be rotated and moved axially, an arm rotatably mounted on said rod, a key carried by said rod and engageable with said arm, a bracket for supporting said rod, a stop carried by the end of said rod, a coil spring positioned around said rod between said bracket and said stop, and deformable cushion means carried around said spring.

9. In combination with a shift rod arranged to be operated from a steering column, a U-shaped bracket secured to said steering column and journaling the lower end of said rod, a pair of arms mounted on said rod and positioned between the legs of said U-shaped bracket, a key carried by said rod, means formed on said arms adapted to engage said key, said rod being movable axially to selectively engage said key with either of said arms, and a coil spring positioned around said rod and between said arms.

10. Gear shifting mechanism comprising a U-shaped bracket, a shift rod having its lower end supported by the sides of said U-shaped bracket, a pair of arms supported on said rod between the sides of said bracket, a key carried by said rod within said bracket and engageable with said arms, and a spring positioned between said arms.

11. Gear shifting mechanism comprising a U-shaped bracket, a shift rod having its lower end supported by the sides of said U-shaped bracket, a pair of arms supported on said rod between the sides of said bracket, a key carried by said rod within said bracket and engageable with said arms, a spring positioned between said arms, and a sleeve positioned around said spring and rod between said arms.

12. In combination with a shift rod arranged to be operated from adjacent a steering column, a U-shaped bracket, the legs of which define aligned apertures, said shaft being journaled in said apertures, a pair of arms formed of flat material having cup shaped portions formed therein, said cup shaped portions defining notched apertures through which said rod extends, a coil spring positioned between said arms and centered by said cup shaped portions to urge said arms against the legs of said U-shaped bracket, a key carried by said rod selectively engageable with either of said notched apertures, and means for rotating said rod and moving said rod axially.

13. Gear shifting mechanism comprising a rod arranged to be rotated and moved axially, a pair of arms mounted for rotation about said rod, a key carried by said rod selectively engageable with either of said arms, a bracket for supporting said rod, a collar secured to said rod adjacent to said bracket, a disc of spring material supported around its edge by said collar and having an annular rib formed therein, and a rubber washer positioned around said rod and against said bracket, said annular rib being arranged to abut against said washer when said rod is at one limit of its axial movement.

NILS ERIK WAHLBERG.